United States Patent
Becker et al.

(10) Patent No.: US 9,689,972 B2
(45) Date of Patent: *Jun. 27, 2017

(54) SCANNER DISPLAY

(71) Applicant: FARO TECHNOLOGIES INCORPORATED, Lake Mary, FL (US)

(72) Inventors: Reinhard Becker, Ludwigsburg (DE); Bernd-Dietmar Becker, Ludwigsburg (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,685

(22) Filed: Jan. 12, 2017

(65) Prior Publication Data

US 2017/0123054 A1 May 4, 2017

Related U.S. Application Data

(63) Continuation of application No. 13/197,404, filed on Aug. 3, 2011, now Pat. No. 9,599,715.

(Continued)

(51) Int. Cl.
| | |
|---|---|
| G01N 21/00 | (2006.01) |
| G09G 5/00 | (2006.01) |
| G06T 15/00 | (2011.01) |
| G09G 5/02 | (2006.01) |
| G01B 11/24 | (2006.01) |
| H04N 7/18 | (2006.01) |
| G01S 7/51 | (2006.01) |
| G01S 17/42 | (2006.01) |

(Continued)

(52) U.S. Cl.
CPC .............. G01S 7/51 (2013.01); G01S 7/4817 (2013.01); G01S 17/42 (2013.01); G01S 17/89 (2013.01)

(58) Field of Classification Search
CPC ....................................................... G01S 17/89

(Continued)

(56) References Cited

U.S. PATENT DOCUMENTS

| | | |
|---|---|---|
| 5,546,189 A | 8/1996 | Svetkoff et al. |
| 7,342,650 B2 | 3/2008 | Kern et al. |

(Continued)

FOREIGN PATENT DOCUMENTS

WO 2008054203 A1 5/2008

OTHER PUBLICATIONS

Brochure—Topcon is Imaging Station—Long-Range Scanning, Imaging and Robotic Total Station—pp. 1-4; 2008 Topcon Corporation Rev. A Mar. 2008.

(Continued)

*Primary Examiner* — Christopher S Kelley
*Assistant Examiner* — Matthew Kwan
(74) *Attorney, Agent, or Firm* — Cantor Colburn LLP

(57) ABSTRACT

A laser scanner collects gray-scale values and associated 3D coordinates of a scanned object in a spherical coordinate system, and displays reformatted gray-scale values that are reformatted from the spherical coordinate system into a planar view rectangular region. The reformatted gray-scale values have at least one straight line of the object appearing as a curved line on a display. The scanner enables selection of an angular range of measurement, measures gray-scale values and associated 3D coordinates in the spherical coordinate system over the angular range of measurement, displays the reformatted gray-scale values, the reformatted gray-scale values being the gray-scale values reformatted from the spherical coordinate system into a rectangular shaped region, the rectangular shape of the region extending and covering the angular range, and saves the reformatted gray-scale values and associated 3D coordinates on a storage medium, the associated 3D coordinates being 3D coordinates associated with the gray-scale values.

6 Claims, 11 Drawing Sheets

Related U.S. Application Data

(60) Provisional application No. 61/370,157, filed on Aug. 3, 2010.

(51) Int. Cl.
  *G01S 7/481* (2006.01)
  *G01S 17/89* (2006.01)

(58) Field of Classification Search
  USPC .......................................................... 348/135
  See application file for complete search history.

(56) References Cited

U.S. PATENT DOCUMENTS

| | | |
|---|---|---|
| 7,626,690 B2 | 12/2009 | Kumagai et al. |
| 7,869,005 B2 | 1/2011 | Ossig et al. |
| 2003/0047684 A1 | 3/2003 | Riegl et al. |
| 2005/0102063 A1 | 5/2005 | Bierre |
| 2006/0244746 A1 | 11/2006 | England et al. |
| 2007/0065002 A1 | 3/2007 | Marzell et al. |
| 2008/0075326 A1 | 3/2008 | Otani et al. |
| 2008/0088623 A1 | 4/2008 | Bukowski et al. |
| 2008/0144968 A1 | 6/2008 | Cohen et al. |
| 2009/0060345 A1 | 3/2009 | Wheeler et al. |
| 2010/0053163 A1 | 3/2010 | Wallace et al. |

OTHER PUBLICATIONS http:/3rdtech.com/DeltaSphereannouncement.htm, "New Portable 3D Scene Digitizer from 3rdTech Sets New Standards for Range and Accuracy", Mar. 2, 2001, 3rdTech Inc., p. 1.

Non-Final Office Action dated Nov. 27, 2015 for U.S. Appl. No. 13/197,404; 15 pages.

US Non-Final Office Action dated Feb. 26, 2015 for U.S. Appl. No. 13/197,404; 14 pages.

Row 2570,Col:2226  85.73° -2.415° d:3.727m  XYZ -44.483m -39.724m -6.608m  RF:1742

SCANNER DISPLAY

CROSS-REFERENCE TO RELATED APPLICATIONS

This application is a continuation application of U.S. application Ser. No. 13/197,404, filed Aug. 3, 2011, which claims the benefit of provisional U.S. Application Serial No. 61/370,157 filed Aug. 3, 2010, the contents of which are hereby incorporated by reference in their entirety.

BACKGROUND OF THE INVENTION

The subject matter disclosed herein relates generally to optical scanning, and more particularly to laser scanners.

Laser scanners, such as the FARO Photon 120, are typically used for scanning closed or open spaces like interior spaces of buildings, industrial installations, and tunnels. Laser scanners are used for many purposes, including industrial applications and accident reconstruction applications. A laser scanner can be used to optically scan and measure objects in a volume around the laser scanner. Laser scanners collect a variety of data points representing objects in the surrounding volume. Such data points are obtained by transmitting a beam of light onto the objects in the volume and collecting the reflected or scattered light to determine, for each point, a distance, two angles (for example, an azimuth and a zenith angle), and a gray-scale value (i.e., a quantity related to the irradiance of the scattered light returned to the scanner). This raw scan data is collected, stored and sent to a processor or processors to generate a scanner image that represents the objects measured in the three dimensional (3D) volume surrounding the scanner, the scanner image being displayed on a monitor or similar device. In order to generate the scanner image, at least four values are collected for each data point. These four values may be the distance, two angles, and gray-scale value, as described above, or they may be transformed values such as the x, y, and z coordinates, in addition to the gray-scale value.

Many contemporary laser scanners also include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space if the field of view needs adjusting. In addition, the camera digital images may be transmitted to a processor to add color to the scanner image. In order to generate a color scanner image, at least six values (three positional coordinates such as x, y, z; and red value, green value, blue value or "RGB") are collected for each data point.

One drawback to relying on a camera digital image for determining that the correct data has been gathered by the laser scanner is that the process of taking pictures with the digital camera is separate from the process of collecting scan data. The digital image may correctly represent the image, even if the scan data contains an error or is not complete.

This shortcoming may be eliminated through the use of an external computer such as a laptop computer, for example. However, in many situations, it is inconvenient to carry a computer in addition to a scanner and a tripod to a location of interest. An example of such a situation, described in more detail hereinbelow, is a crime scene in which a laser scanner is used for forensic analysis.

Accordingly, and while existing laser scanners may be suitable for their intended purpose, there remains a need in the art for laser scanners that overcome these drawbacks.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention is a laser scanner configured to measure three-dimensional (3D) coordinates of an object. The laser scanner includes: a mirror configured to rotate about a first axis, the mirror having a flat reflective surface; a first portion including the mirror, the first portion configured to rotate about a second axis perpendicular to the first axis, the first portion further including a light emitter, and a light receiver, the light emitter is configured to send emitted light to the mirror for reflection onto the object, the light receiver is configured to receive from the mirror a reflected light, the reflected light being a part of the emitted light reflected by the object; one or more processors that are operably coupled to a tangible non-transitory storage medium, the light emitter and the light receiver; and, a display unit operably coupled to the processor, the display unit further being coupled to the laser scanner. The one or more processors being responsive to executable instructions which when executed by the processor is operable to: cause the scanner to collect gray-scale values and associated 3D coordinates in a spherical coordinate system based at least in part on the light received by the light receiver; display on the display unit reformatted gray-scale values, the reformatted gray-scale values being gray-scale values reformatted from the spherical coordinate system into a rectangular region as a planar view; the reformatted gray-scale values when reformatted from the spherical coordinate system into the rectangular region in the planar view have at least one straight line of the object scanned appearing as a curved line on the display; enable selection of a first angular range of measurement about the second axis, the first angular range of measurement being between 0 and 360 degrees; cause the laser scanner to measure first gray-scale values and associated 3D coordinates in the spherical coordinate system over the first angular range of measurement; display on the display unit the first reformatted gray-scale values, the first reformatted gray-scale values being the first gray-scale values reformatted from the spherical coordinate system into a first region, the first region being rectangular in shape, the rectangular shape of the first region extending and covering the first angular range; and save the first reformatted gray-scale values and first associated 3D coordinates on the storage medium, the first associated 3D coordinates being 3D coordinates associated with the first gray-scale values.

Another embodiment of the invention is a laser scanner configured to measure three-dimensional (3D) coordinates of an object. The laser scanner includes: a mirror configured to rotate about a first axis, the mirror having a flat reflective surface; a first portion including the mirror, the first portion configured to rotate about a second axis perpendicular to the first axis, the first portion further including a light emitter, and a light receiver, the light emitter is configured to send emitted light to the mirror for reflection onto the object, the light receiver is configured to receive from the mirror a reflected light, the reflected light being a part of the emitted light reflected by the object; one or more processors that are operably coupled to a tangible non-transitory storage medium, the light emitter and the light receiver; and, a display unit operably coupled to the processor, the display unit further being coupled to the laser scanner. The one or more processors being responsive to executable instructions which when executed by the processor is operable to: cause the scanner to collect gray-scale values and associated 3D coordinates in a spherical coordinate system based at least in part on the light received by the light receiver; map the gray-scale values and the associated 3D coordinates onto a geometrical shape to obtain first mapped values; enable selection of a first viewing direction; display on the display unit a first panoramic view of a first portion of the first mapped values as seen from a fixed point in space in the first viewing direction; and save the first panoramic view on the storage medium.

Another embodiment of the invention is a laser scanner configured to measure three-dimensional (3D) coordinates of an object. The laser scanner includes: a mirror configured to rotate about a first axis, the mirror having a flat reflective surface; a first portion including the mirror, the first portion configured to rotate about a second axis perpendicular to the first axis, the first portion further including a light emitter, and a light receiver, the light emitter is configured to send emitted light to the mirror for reflection onto the object, the light receiver is configured to receive from the mirror a reflected light, the reflected light being a part of the emitted light reflected by the object; one or more processors that are operably coupled to a tangible non-transitory storage medium, the light emitter and the light receiver; and, a display unit operably coupled to the processor, the display unit further being coupled to the laser scanner. The one or more processors being responsive to executable instructions which when executed by the processor is operable to: cause the scanner to collect gray-scale values and associated 3D coordinates in a spherical coordinate system based at least in part on the light received by the light receiver; enable selection of a first viewing position and a first viewing direction; map the gray-scale values and the associated 3D coordinates into an undistorted 3D representation of the object; display on the display unit a first 3D view of the object, the first 3D view being a portion of the undistorted 3D representation of the object as observed from the first viewing position and the first viewing direction; and save the first 3D view on the storage medium.

Another embodiment of the invention is a method for measuring a volume of space with a laser scanner. The method includes providing a laser scanner including a transmitter, a receiver, a beam steering mechanism, and a display unit, the display unit integral to the laser scanner. A beam of light is sent from the transmitter to the beam steering mechanism, and plurality of measuring beams are sequentially launched from the beam steering mechanism to a plurality of measuring points in the volume of space. A plurality of reflected beams that are a portion of the measuring beams reflected by the measuring points are received. A plurality of distances to the measuring points are determined based at least in part on propagation times of the measuring beams and the reflected beams. A plurality of gray-scale values representative of the measuring points are determined, where the gray-scale values are based at least in part on optical powers of the reflected beams. Gray scale values are assigned to elements of a measuring point array, where a first index of the measuring point array is associated with an order of measurement of the measuring points. The measuring point array is transformed into a display point array according to a first mathematical rule. The display point array corresponds to a first number of display points and the measuring point array corresponds to a second number of measuring points, the second number greater than the first number. The transforming includes assigning display gray-scale values to elements of the display point array. For each display point, a pixel of the display unit is illuminated, with the level of illumination depending on the display gray-scale value.

Another embodiment is a method for measuring a volume of space with a laser scanner. The method includes providing a laser scanner including a transmitter, a receiver, a beam steering mechanism, an image capturing unit, and a display unit, the display unit integral to the laser scanner. A beam of light is sent from the transmitter to the beam steering mechanism, and plurality of measuring beams are sequentially launched from the beam steering mechanism to a plurality of measuring points in the volume of space. A plurality of reflected beams that are a portion of the measuring beams reflected by the measuring points are received. A plurality of distances to the measuring points are determined based at least in part on propagation times of the measuring beams and the reflected beams. Objects within the volume of space are illuminated with background light, and an image of the objects is captured within the image capturing unit. The image capturing unit includes pixels, with each pixel providing color information. A measuring point array is created, where a first index of the measuring point array is associated with an order of measurement of the measuring points. The measuring point array is transformed into a display point array according to a first mathematical rule. The display point array corresponds to a first number of display points and the measuring point array corresponds to a second number of measuring points, the second number greater than the first number. Color information obtained from the pixels of the image capturing unit is overlaid onto the display point array. The color information overlaid on each display point represents substantially the same region of space as the region of space represented by the display point. For each display point, a pixel of the display unit is illuminated, with the illumination color and brightness depending on the color information overlaid onto the display point.

Another embodiment is a laser scanner for measuring a volume of space. The laser scanner includes a transmitter, a receiver, a beam steering mechanism, and a display unit integral to the laser scanner. The laser scanner also includes a processor configured to facilitate a method that includes sending a beam of light from the transmitter to the beam steering mechanism. A plurality of measuring beams are sequentially launched from the beam steering mechanism to a plurality of measuring points in the volume of space. A plurality of reflected beams that are a portion of the measuring beams reflected by the measuring points are received. A plurality of distances to the measuring points are determined based at least in part on propagation times of the measuring beams and the reflected beams. A plurality of gray-scale values representative of the measuring points are determined, where the gray-scale values are based at least in part on optical powers of the reflected beams. Gray scale values are assigned to elements of a measuring point array, where a first index of the measuring point array is associated with an order of measurement of the measuring points. The measuring point array is transformed into a display point array according to a first mathematical rule. The display point array corresponds to a first number of display points and the measuring point array corresponds to a second number of measuring points, the second number greater than the first number. The transforming includes assigning display gray-scale values to elements of the display point array. For each display point, a pixel of the display unit is illuminated, with the level of illumination depending on the display gray-scale value.

A further embodiment is a laser scanner for measuring a volume of space. The laser scanner includes a transmitter, a receiver, a beam steering mechanism, an image capturing unit, and a display unit integral to the laser scanner. The laser scanner also includes a processor configured to facilitate a method that includes sending a beam of light from the transmitter to the beam steering mechanism. A plurality of measuring beams are sequentially launched from the beam steering mechanism to a plurality of measuring points in the volume of space. A plurality of reflected beams that are a portion of the measuring beams reflected by the measuring points are received. A plurality of distances to the measuring points are determined based at least in part on propagation times of the measuring beams and the reflected beams. Objects within the volume of space are illuminated with background light, and an image of the objects is captured within the image capturing unit. The image capturing unit includes pixels, with each pixel providing color information. A measuring point array is created, where a first index of the measuring point array is associated with an order of measurement of the measuring points. The measuring point array is transformed into a display point array according to a first mathematical rule. The display point array corresponds to a first number of display points and the measuring point array corresponds to a second number of measuring points, the second number greater than the first number. Color information obtained from the pixels of the image capturing unit is overlaid onto the display point array. The color information overlaid on each display point represents substantially the same region of space as the region of space represented by the display point. For each display point, a pixel of the display unit is illuminated, with the illumination color and brightness depending on the color information overlaid onto the display point.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
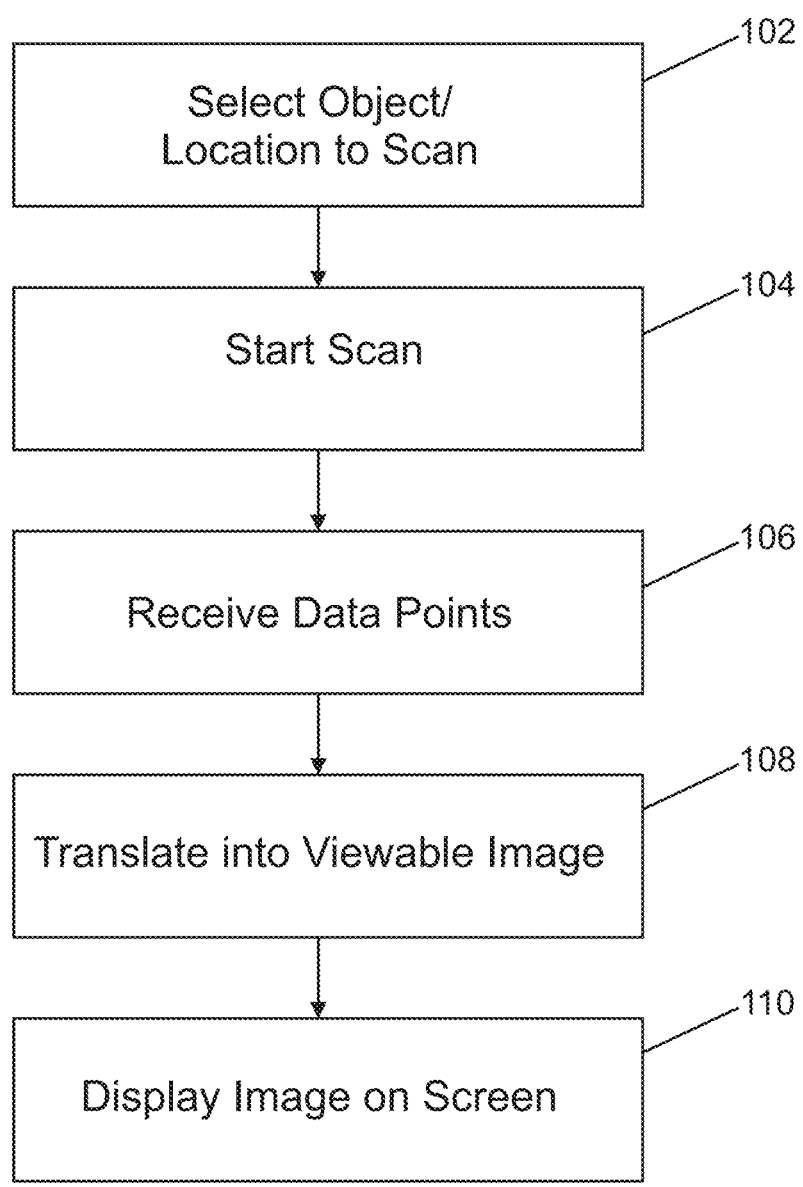
FIG. 1 depicts a process flow for displaying scan image data on a user interface on a laser scanner that is implemented in accordance with an embodiment.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Contemporary scanners have mostly been used in applications wherein the collected scanner data can be reviewed on a personal computer or a laptop computer attached to the scanner (i.e., external to the scanner). The procedure of reviewing the data on a computer is relatively time consuming, and hence in many cases an operator relies on a camera image to determine whether sufficient data has been collected. If problems are seen in the camera image, the operator is provided with an indication that additional data needs to be taken. Hence, the image from a digital camera has in many cases been considered adequate. Examples of contemporary scanners are described, for example, in U.S. Pat. No. 7,193,690, U.S. Pat. No. 7,430,068, U.S. Pat. No. 7,869,005, and U.S. Patent Publication No. 2010/0134596, all of which are hereby incorporated by reference in their entirety.

An embodiment of a laser scanner described herein is a stand-alone portable scanner (i.e., a scanner that does not require attachment to an external computer to process and display a scanner image). In most cases, the scanner is kept still by mounting it on a tripod. Embodiments of the laser scanner described herein may be taken into field situations in which assurance of data integrity is vital. One example of such a situation is the taking of the portable scanner onto a forensics scene, as part of a homicide investigation. In this case, scanner images are preferably collected and displayed by a stand-alone portable scanner. In addition, in this situation it is not convenient to attach the scanning device to a laptop computer (e.g., additional equipment increases the chance of contaminating the crime scene and increases the time required to setup and complete the measurement). The forensics examiner will have only a short time to collect data at the crime scene, and he or she must ensure that all relevant data is collected, as it may not be available for viewing at a later time. He or she must be assured that all relevant data has been collected. A digital camera image cannot supply this assurance. Only by viewing the point-by-point scan data collected and displayed by embodiments of the laser scanner described herein can the forensics examiner be confident that no areas on the scan need to be measured again.

Also, the forensics examiner might want to take a closer look at some particular parts of the scene, to see how well a blood spatter pattern has been collected, for example. If the pattern is not adequate, the forensics examiner might elect to repeat the measurement over a more limited area or may move the laser scanner described herein to a more advantageous location. Hence, an embodiment of the laser scanner described herein allows the operator of the laser scanner a new method of assessing scan quality before leaving the scene. In addition, an embodiment of the laser scanner described herein allows the operator to make measurements (e.g., distances or angles between points within the crime or accident scene) before leaving the scene. This is done without the assistance of a laptop computer or the addition of a technician on the scene.

As mentioned herein above, a laser scanner is often mounted on a tripod for stability. Because laser scanners are often manually moved from place to place, the tripod selected is usually relatively light weight and prone to movement if bumped. This is particularly a problem on a hard floor or smooth surface. In many cases, the laser scanners have an angular accuracy of a few arc seconds, and hence any type of movement of the tripod on which the scanner is mounted will results in relatively significant errors. One way to minimize the chance of moving the tripod is to eliminate any cables going to the laser scanner. In particular, power cables and cables from computers, including laptop or desktop computers, should be eliminated. This can be done by providing a battery internal to the laser scanner and also a built-in display unit, as is disclosed herein below. Furthermore, because the operator often has a need to change settings on the laser scanner or to perform other user interface functions, having a user interface associated with a built-in display is also advantageous.

An alternative method for avoiding cables is to provide a laser scanner having a wireless capability for communication with an external laptop computer. However, use of a laptop computer in this way has disadvantages in comparison to a built-in scanner display unit. For example, it is generally necessary to find a separate stand or table to hold a laptop computer. Alternatives such as holding a laptop computer in hand or setting a laptop computer on the floor are not desirable alternatives. In addition, laptop computers tend to be relatively large, which means that the extra weight and space of a laptop computer can be a limitation. A good example of this is the use of a laser scanner is performing surveying functions, which may be at remote sites, thereby requiring that the laser scanner and associated electronics be carried in.

An alternative to a laptop computer is a handheld personal digital assistant (PDA), Smartphone, or similar device. Such a device could be made to contain wireless capability, and it can also be made to include computing power and the ability to save data on a storage device. However, even though use of a small handheld device is advantageous compared to the use of a laptop, it has disadvantages compared to a built-in display. A first disadvantage is that many factories, especially those involved with defense or high-technology applications, will not allow wireless communications devices to be used within a factory area. Part of the reason for this is the possibility of a wireless signal being intercepted and improperly interpreted by a piece of machinery. A large piece of machinery sent into an improper course of action can do considerable damage. Another reason for the restriction on wireless usage in some factories is the possibility of eavesdropping on wireless messages or in obtaining access to sensitive company or defense information. Another disadvantage of using a handheld device is that such devices can easily be lost or misplaced. This is particularly the case if a laser scanner is shared by many people, for example, in a forensics laboratory. A third disadvantage of a handheld device is that the device must be powerful enough to process the large data sets provided by a laser scanner. In some cases, laser scanners collect data at a rate of approximately one million points per second. Processing such large amounts of data would generally require a relatively large and expensive handheld device, and the transmission of such large quantities of data by wireless means can be a problem.

Figure 4:
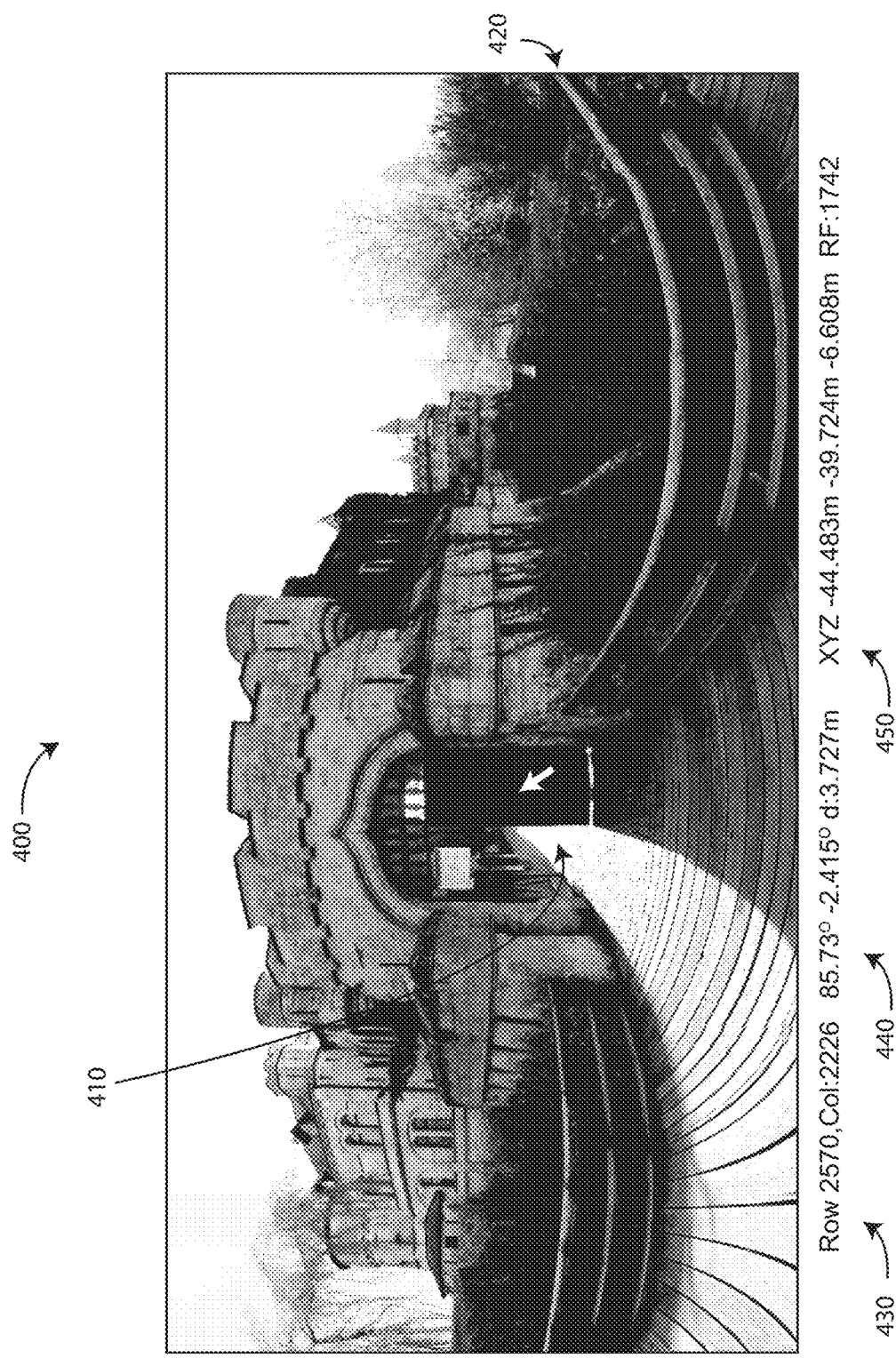
FIG. 4 depicts an embodiment of a planar view of a 3D scanned image.

An embodiment of the invention, as shown and described by the various figures and accompanying text, outputs a 3D scanned image to a user interface screen located on a laser scanner. The scanned image may be displayed in a planar view, a panoramic view, or a 3D view. In each type of view, the image is presented on a flat screen, but the perspectives and distortions of the displayed image are different in each case. For most types of scanners, the collected data is in the form of two angles and one radial distance; in other words, data is collected in a spherical coordinate system. In the simplest type of display, herein referred to as a planar display, the data is simply reformatted into a rectangular region. In a planar view, straight lines in the physical world may appear as curves. An example of this effect is shown in FIG. 4, wherein the lines of a fence 420, straight in the physical world, appear as curves in the planar view. Also, a planar view is inherently a flat view so that it is not possible to rotate a planar image to obtain different views of an object.

In a panoramic view, objects in the measurement volume are mapped onto a geometrical shape such as a sphere, cube, or cylinder, thereby removing the distortions seen in the planar view. In a panoramic view, a user can turn the view but cannot leave the center of the view. In a 3D view, a user can leave the center of the view and observe an undistorted 3D image from any desired location and orientation. A 3D view can even allow a user to "fly" through 3D images of a measured volume, thereby enabling the user to view the measured volume from a variety of views.

The planar, panoramic, and 3D views described above may be contrasted to a "camera digital image" which as used herein refers to a two dimensional (2D) photographic image.

Each of these views—planar, panoramic, and 3D—can be presented on a monitor in a full or reduced format. The view may appear in a reduced format (e.g., every nth pixel is displayed) to give the user a quick manner of determining if every important element of the scan has been recorded. In addition, each of these types of views can include a single view or several views that have been registered together.

Advantages to displaying scan image data on a user interface on the laser scanner includes the ability to verify that the scan data has been captured correctly and that the scan by the laser scanner is complete. In addition, the operator can determine whether any other scans by the laser scanner would be helpful before leaving the scene of the scan. Thus, the operator can avoid having to come back to the scene to set up and redo all or a portion of the original scan. Furthermore, in some cases, the scene may be modified so that the scan can only be collected at the initial time. These advantages can be obtained without the disadvantages associated with having to transport and setup a laptop computer and associated cables.

Figure 3:
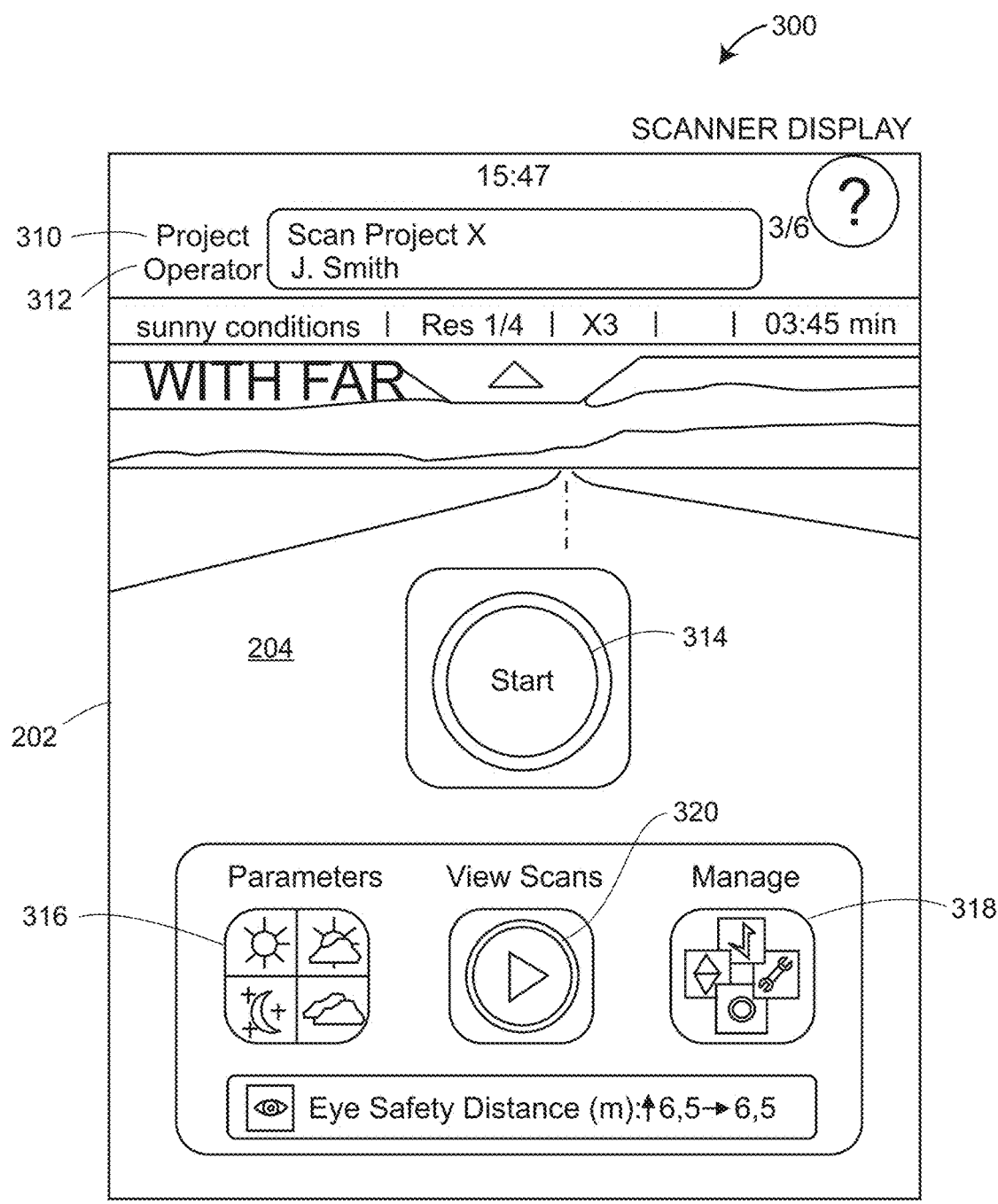
FIG. 3 depicts a user interface screen including a touch screen that is utilized by an operator of the laser scanner in accordance with an embodiment.

FIG. 1 depicts a process flow for displaying scan data on a user interface on a laser scanner that is implemented in accordance with an embodiment. At block 102, the operator selects the volume of space to be scanned. In an embodiment, the laser scanner is set up to include at least one object of interest. In another embodiment, the laser scanner is set up to include objects within at least one geographical location. In an embodiment, the laser scanner is set up to include objects within a region of space. In an embodiment, before the scan, the operator of the laser scanner can inspect and set parameters such as, but not limited to: scan area, resolution, scan quality, filter settings, and color or black and white scan. In an embodiment, the laser scanner is portable and can be carried by hand. In an embodiment, the set up process includes setting the laser scanner on a tripod or stand in order to increase the accuracy of the scan. FIG. 3 below depicts an example user interface screen that is used by an operator to set the parameters.

At block 104, once the set up process has been completed, the laser scanner begins the scan.

At block 106, the laser scanner receives data points that include, but are not limited to: distance information, gray-scale values for each distance measurement value, vertical angle information, and horizontal angle information. The distance measurement value, vertical angle information, and horizontal angle information are collectively referred to herein as 3D coordinates. The distance and angle measurements can be used to convert 3D coordinates obtained in the natural coordinate system of a scanner, which may be a spherical coordinate system, for example, into any other desired 3D coordinate system, for example, a rectangular (Cartesian) or cylindrical coordinate system. In an embodiment, the scan data (i.e., the data points) is sent, via a direct data link, to a computer processor that is part of the scanner (e.g., an embedded personal computer); the computer processor then stores the data on a data storage device (e.g., a storage device "SD" card). In an embodiment, the data on the data storage device is scan data that is used to create a 3D unprocessed scanned image. The 3D unprocessed scanned image can be compensated for distance deviations, angular deviations, and other deviations; can be colorized through the mapping of color information from one or several digital images onto the scan data; can be preprocessed (e.g., filtered to remove invalid or unwanted points); and can be registered against other scanned image data (e.g., via one or more targets that are natural and/or inserted).

In an embodiment, when the operator has selected a color scan, after the laser scanning is completed and the scan data is captured, a digital camera located on the laser scanner takes digital 2D photographic images of the scanned scene in order to capture color data to add to the scanned image. In an embodiment, the scanner takes pictures of the scene by stepwise turning a mirror in the laser scanner until a 360° rotation has been done. When that rotation is complete, a stripe-like area around the scanner has been recorded. Next the horizontal axis is turned a specified angular step forward and the mirror starts a stepwise turn to record the next stripe of the scanner environment. This is done until the whole volume around the scanner has been recorded. In an embodiment, the digital image data is sent directly to the computer processor in the scanner and stored on the storage device in the scanner.

At block 108, the scanned image data is translated into a viewable image that can be displayed on a display screen on the laser scanner. In an embodiment, the viewable image is a 3D unprocessed scanned image of the gray-scale scanned picture. In an embodiment, the 3D unprocessed scanned image is generated by sub-sampling the scan data (e.g., by taking every $n^{th}$ pixel) resulting in a reduced resolution. In an alternative embodiment, the 3D unprocessed scanned image is generated by combining the information from multiple adjacent pixels to represent average 3D coordinates of a pixel on the display unit of the laser scanner. In an embodiment, the 3D unprocessed scanned image is a two dimensional (2D) black and white image of the 3D scan. In other embodiments, the 3D unprocessed scanned image is a 3D color image, a 3D black and white image, or a 2D color image. If color images are mapped to the scanned image, then the planar view has colors and becomes a "2D color image" of the 3D scan. A "3D black and white image" is a 3D view of the not yet colored scan and a "3D color image" is a 3D view of the colored scan. A distinction between a planar view and a view of an unprocessed image is that the planar view might show already processed data (e.g., colorized or compensated data). In an embodiment, the scan data used to create the 3D unprocessed scanned image has not been compensated for electrical and/or optical cross talk; and it may have some uncompensated inaccuracies depending on the distance being measured (i.e., may have greater variations with greater distances).

At block 110, the 3D unprocessed scanned image is displayed on a display unit integral to the laser scanner, the display associated with a user interface screen. The operator (also referred to herein as a "user"), via a user interface screen, can inspect the image by scrolling, zooming in, zooming out, rotating, and panning for example. Other operator options from a user interface screen include, but are not limited to: changing scan parameters, starting the next scan, and selecting an area of the image to set the angular limits for the next scan and starting the next scan. The operator can also use the interface screen to view the 3D coordinates of user selected locations in the 3D unprocessed scanned image. In an embodiment, the operator, via the user interface screen, may measure dimensional quantities in the 3D unprocessed scanned image (e.g., lengths, areas, volumes). In an additional embodiment, the operator, via the user interface screen, may annotate or draw on the image.

In an embodiment, blocks 106 and 108 are performed iteratively while the scan is in process and the 3D unprocessed scanned image is updated periodically during the scanning. In another embodiment, blocks 106, 108 and 110 are performed iteratively and the displayed 3D unprocessed scanned image is updated periodically during the scanning. Such a process may be referred to a providing a real-time display or "painting the collected data on the display" while the measurement is in process.

Figure 2:
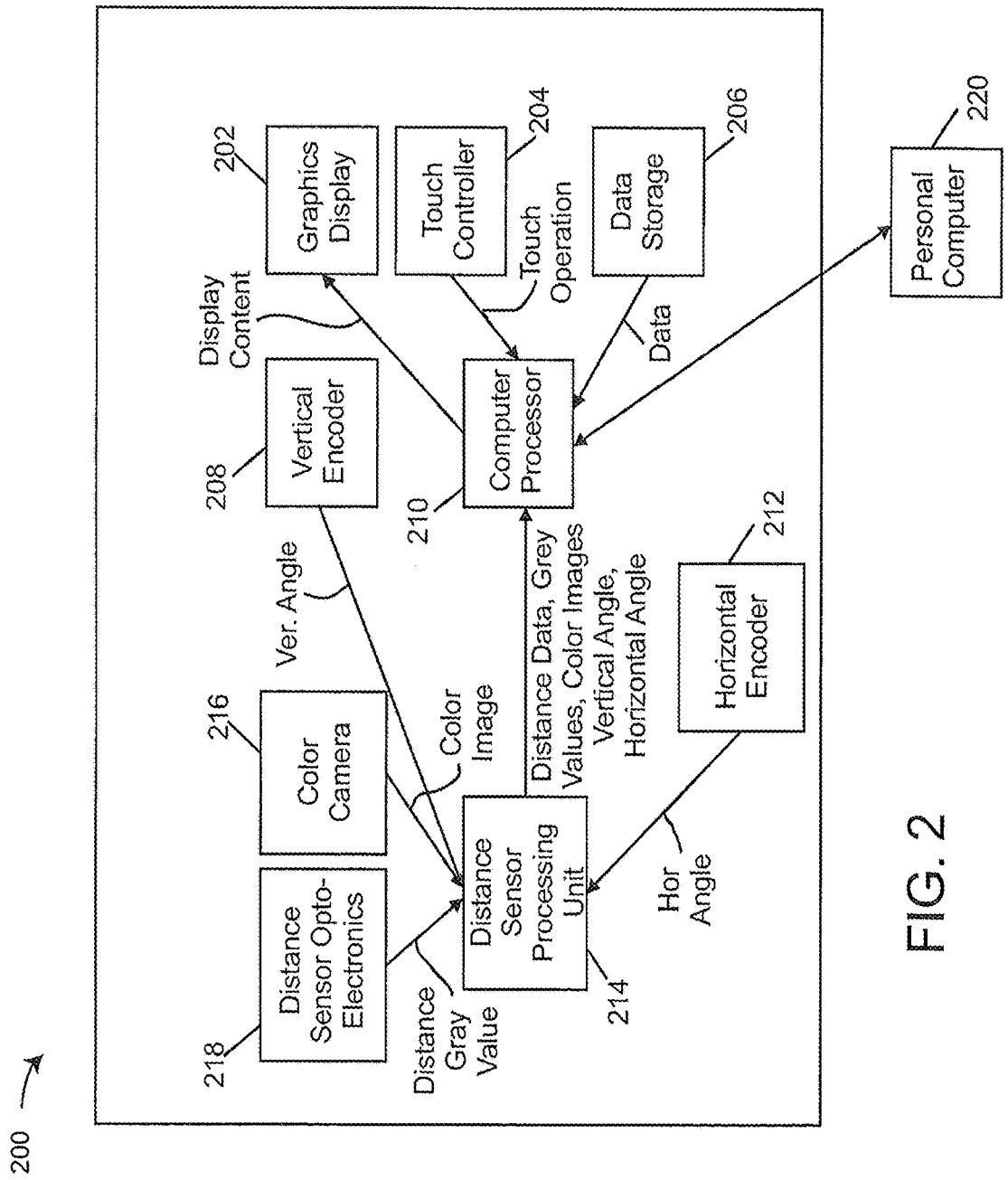
FIG. 2 depicts a laser scanner that includes a user interface for displaying scan image data in accordance with an embodiment.

FIG. 2 depicts a laser scanner 200 that includes a user interface for displaying scan image data in accordance with an embodiment. The laser scanner 200 depicted in FIG. 2 includes a distance sensor processing unit 214 (implemented, for example, by a field programmable gate array or "FPGA") for collecting scan data from a distance sensor opto-electronics module 218, a color camera 216, a vertical encoder 208 and a horizontal encoder 212. In an embodiment, the distance sensor opto-electronics module 218 determines a distance to target data points (e.g., target objects) in the scene being scanned and generates gray-scale values that correspond to the amount of light reflected back from the target objects; both the distance and gray-scale values are communicated to the distance sensor processing unit 214. The horizontal encoder 212 communicates the horizontal angle to the distance sensor processing unit 214. The vertical encoder 208 communicates the vertical angle to the distance sensor processing unit 214.

In an embodiment, the distance sensor processing unit 214 sends the collected scan data to a computer processor 210 (e.g., running the Linux operating system) in the laser scanner 200. The computer processor 210 may transmit the scan data to a data storage device 206 (e.g., a SD card, or a hard drive). In an embodiment, the computer processor 210 embedded in the laser scanner 200 transmits a subset of the collected scan data, processed by the computer processor 210, to a graphics display 202 located on the laser scanner 200 to display a full or reduced image of the 3D unprocessed scanned image. The computer processor 210 may receive input from a touch controller 204 (a touch screen), which in the embodiment depicted in FIG. 2, is a user interface to the laser scanner 200.

In an embodiment, a 3D processed scanned image is generated and displayed on an integrated graphics display unit 202 of the laser scanner 200. The capability to generate and display a 3D processed scanned image on an integrated graphics display 202 is dependent on factors such as the processing power of computer processor 210, the display capabilities of the graphics display 202, and the capacity of the data storage 206.

In an alternative embodiment, the scan data is processed by a device other than the laser scanner 200 to create a scanned image (e.g., a 3D processed scanned image). In an embodiment, the device that creates the 3D processed scanned image is a personal computer 220 external to the laser scanner 200. In an embodiment, the personal computer 220 is attached to the laser scanner 200 via one or more of a physical connection, a wireless connection, and any other means of communication. In other embodiments, other computer processors (e.g., in a mainframe computer) external to the laser scanner 200 are utilized to generate the 3D processed scanned image.

FIG. 3 depicts a user interface screen 300 including graphics display 202 and a touch screen 204 that is utilized by an operator of the laser scanner 200 in accordance with an embodiment. In an embodiment, the user interface screen 300 is a color graphics touch screen display 204 that can be controlled manually with or without a stylus pen (e.g., via gestures).

As shown in FIG. 3, the user interface screen specifies a project name 310 associated with the scan and an operator name 312 performing the scan. An operator can start the scan process, e.g., at block 104 in the process described in reference to FIG. 1, by pushing or otherwise selecting the "start button" 314 shown on the user interface screen 300 in FIG. 3. The embodiment of the user interface screen in FIG. 3 also includes "parameters option" 316 which is selected to set up scan parameters such as those described above in reference to block 102 of FIG. 1. Also as shown in FIG. 3, the user interface screen 300 includes a "manage option" 318 to create, edit and delete projects, operators and profiles; control the settings of scanner parameters and sensors; inspect errors and warnings; activate firmware updates on the SD-card; set the date, time and sounds; calibrate the display; set the display language, and units; control the Wi-Fi connection and others.

As shown in FIG. 3, the user interface screen includes a "view scans" option 320. In an embodiment, the user interface screen 300 displays the 3D unprocessed scanned image in any of several forms: immediately after the scan operation or during the scan operation up to a latest record; in gray tones or colors; as a 2D image with mapping of the sphere to a flat 2D area; as a panoramic picture; as a 3D image; with navigation such as zoom in and out; and/or with recognized objects in the scan (e.g., planes, spheres, tubes, edges, checker board targets). In addition, the touch screen display allows the selection of an area within the shown 3D unprocessed scanned image to determine the horizontal and vertical limits for a subsequent scan operation. In an embodiment, the user interface screen display also shows multiple reduced scans that might have been registered on the fly (e.g., after taking two or more scans, they have to be positioned correctly or "registered" in a common coordinate system to be able to create and show a combined point cloud of all scans). This registration is usually done by using reference points (i.e., natural or artificial targets) that are common in overlapping areas of the scans. In an embodiment, the user interface screen also displays a fly through of a combined point cloud (the combined point cloud is shown in a 3D view as described above, where the user can change the viewpoint and move through the scene); allows different measurements in the point cloud; displays video digital images of the scene from the color camera; allows an overlay of additional information (e.g., point of the compass, the height, the temperature, and GPS Coordinates); allows selected parts of the point cloud to be shown; allows slices of the point cloud to be displayed; allows a transparent view of the point cloud to be shown; allows the creation and display of a reduced/optimized mesh of the point cloud; allows creation and display of a video out of the 3D data; allows the scan data to be analyzed and the results to be visualized (e.g., the outer contours of a building, areas that still have to be scanned, and selected measurements displayed numerically).

As used herein, the term "point cloud" refers to a set of 3D measurements recorded during a scan. The 3D coordinates can be complemented by a gray-scale or color value or other data representing values such as, but not limited to: the temperature, and the distance to another object. Different temperature values can be represented on the display by different colors (e.g., dark red for hottest temperature range, light blue for coolest temperature range, etc.). Distances to another object also be represented on the display by different colors. For example, a scan may include a lobby of a building that includes a front entrance door. The scan of the lobby may be color coded to show the distance of other objects in the scan from the front entrance door (e.g., green being the door, yellow for a first range of distances from the door, orange for a second range of distances from the door, etc.).

An embodiment of the user interface screen allows a user to find the coordinate values (x, y, z) of a particular point in the displayed 3D scanned image by hovering over the point in the scanned image with a cursor (or other manner of specifying the point). In addition, an embodiment of the user interface screen provides a function that draws a line between two points in the scanned image and extracts characteristics of the line (e.g., lengths and angles in 3D).

An embodiment of the laser scanner 200 connects to one or several remote computer processors (e.g., a personal computer via a WLAN) to deliver and store recorded data, to process the data (filtering, registration, octree generation, object recognition, etc.), and to send data back to the laser scanner 200 and/or to stream visual data to the scanner display 202.

FIG. 4 depicts an example of a planar view of a 3D scanned image 400. The planar view depicted in FIG. 4 maps an image obtained in the native coordinate system of the scanner (e.g., a spherical coordinate system) onto a plane (e.g., a planar view). With this type of mapping, straight lines appear to be curved, as for example the straight fence railings 420 that appear curved in the planar view of the 3D image. FIG. 4 displays complete scan of a laser scanner in one image without occultation. The planar view may be a 3D unprocessed scanned image displaying just the gray-scale values received from the distance sensor arranged in columns and rows as they were recorded. In addition, the 3D unprocessed scanned image of the planar view may be in full resolution or reduced resolution depending on system characteristics (e.g., display device, storage, processor). The planar view may be a 3D processed scanned image that depicts either gray-scale values (resulting from the light irradiance measured by the distance sensor for each pixel) or color values (resulting from camera images which have been mapped onto the scan). The user interface associated with the display unit integral to the laser scanner may provide a point selection mechanism, which in FIG. 4 is the cursor 410. The point selection mechanism may be used to reveal dimensional information about the volume of space being measured by the laser scanner. In FIG. 4, the row and column at the location of the cursor are indicated on the display at 430. The two measured angles and one measured distance (the 3D coordinates in a spherical coordinate system) at the cursor location are indicated on the display at 440. Cartesian XYZ coordinate representations of the cursor location are indicated on the display at 450.

Figure 5:
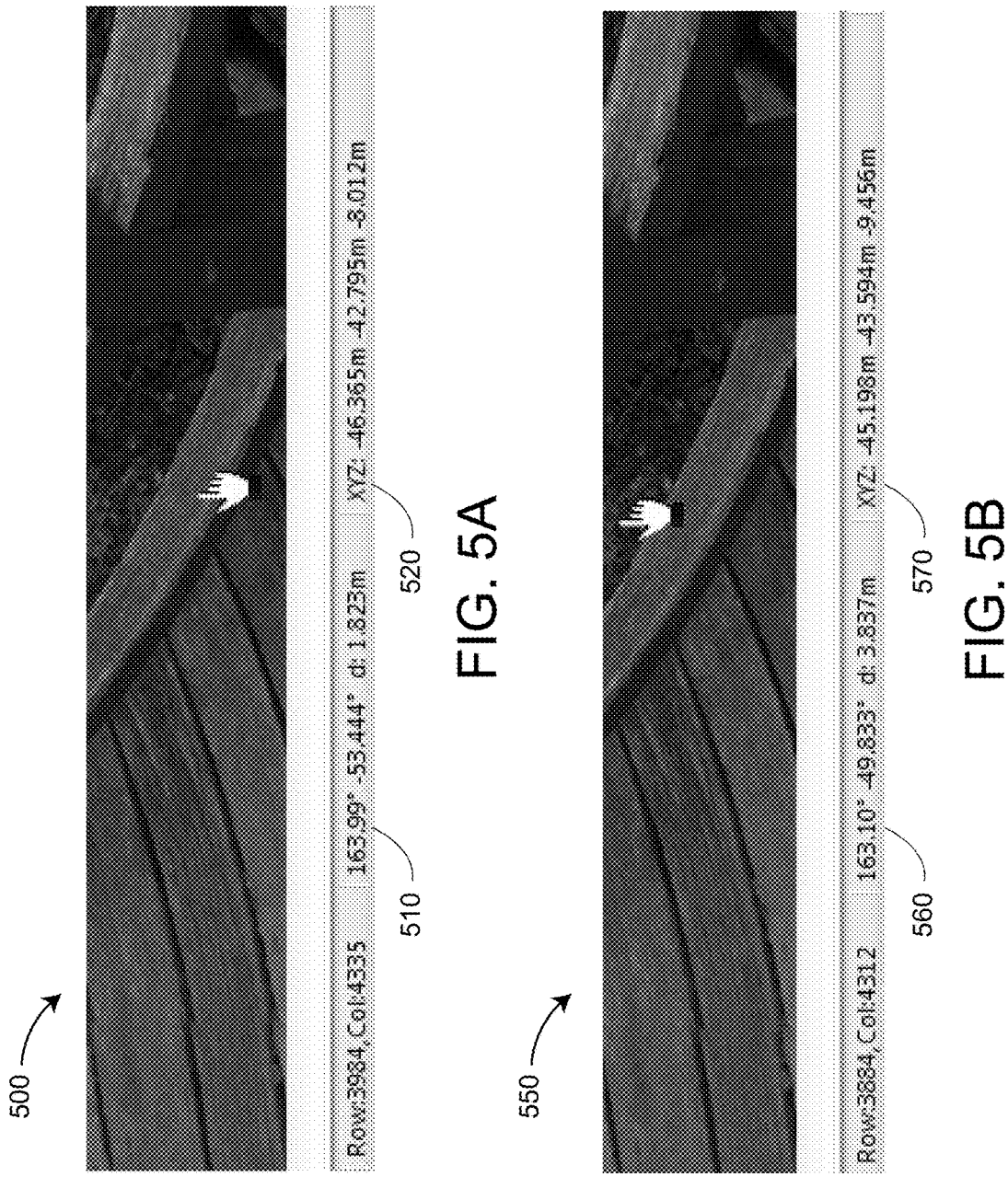
FIGS. 5A and 5B depict an embodiment in which spherical and Cartesian coordinates are displayed for object points represented by pixels in a scanned image.

FIGS. 5A, 5B show another instance in which a display unit shows spherical coordinates 510, 560 and Cartesian coordinates 520, 570 for a pixel selected by a point selection mechanism, the point selection mechanism in this case being in the shape of a hand (a hand marker). FIGS. 5A, 5B illustrate the change in displayed coordinates that result from movement of the hand marker.

Figure 6:
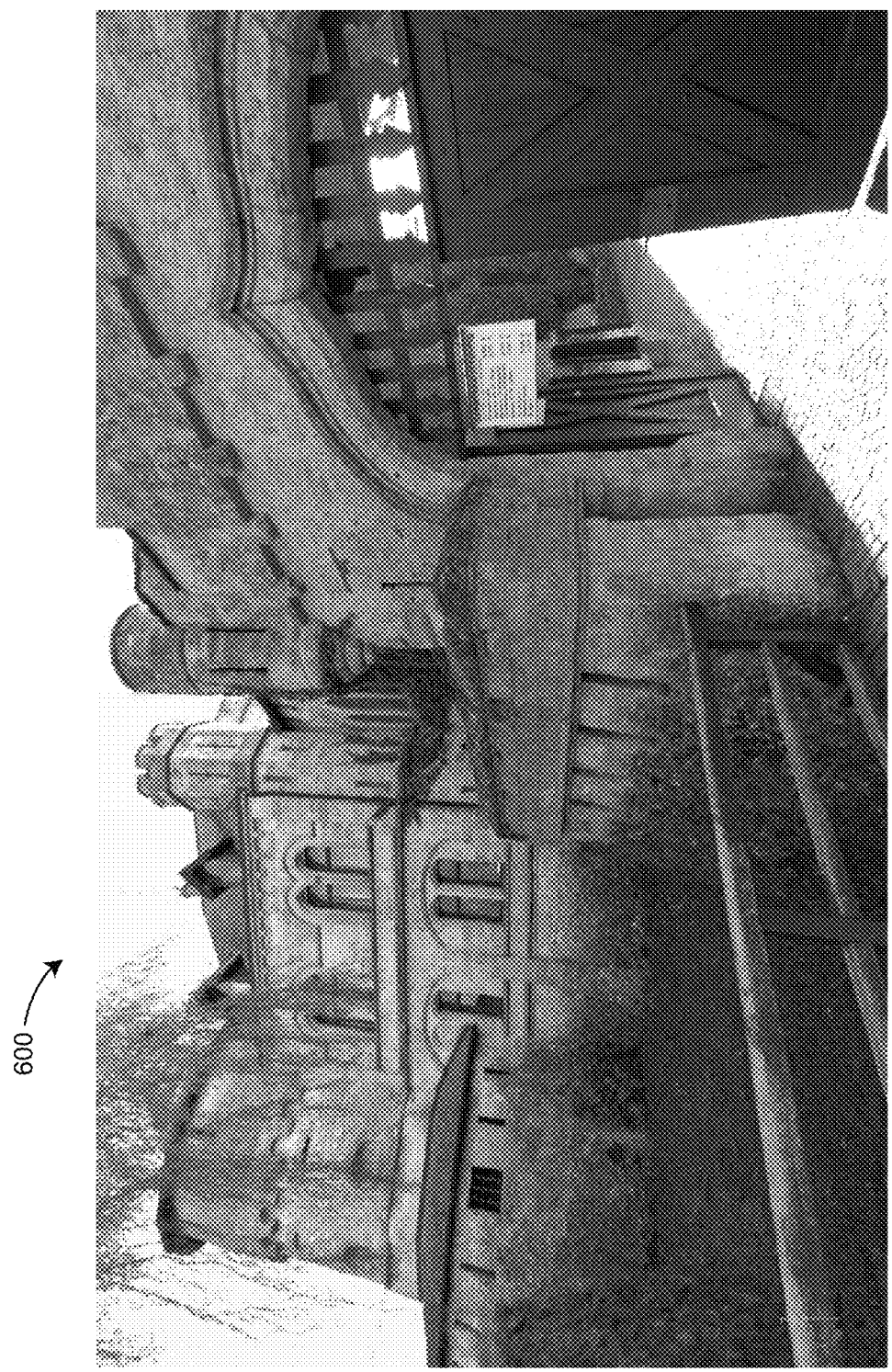
FIG. 6 depicts an embodiment of a panoramic view of a 3D scanned image that is generated by mapping a planar view onto a sphere or cube.

FIG. 6 depicts an example of a panoramic view of a 3D scanned image 600 generated by mapping a planar view onto a sphere. A panoramic view can be a 3D unprocessed scanned image in which no coordinate data is made available to the user, or it can be a 3D processed scanned image (such as that shown in FIG. 6) in which 3D information (e.g., 3D coordinates) is available. The panoramic view may be in full resolution or reduced resolution depending on system characteristics.

Figure 7C:
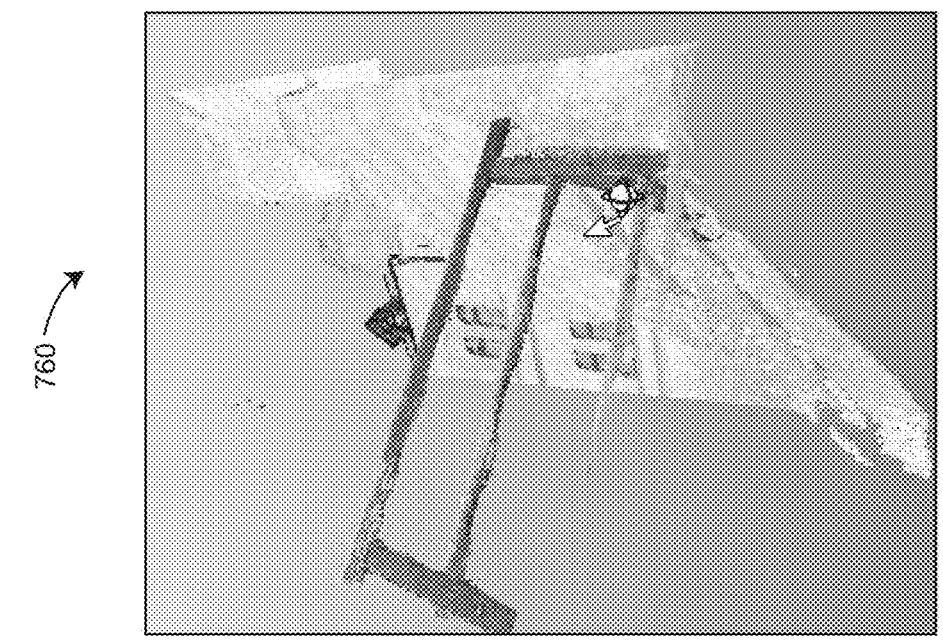
FIGS. 7 A, 7B, 7C depict embodiments of a 3D view of a 3D scanned image.
Figure 7B:
Figure 7A:
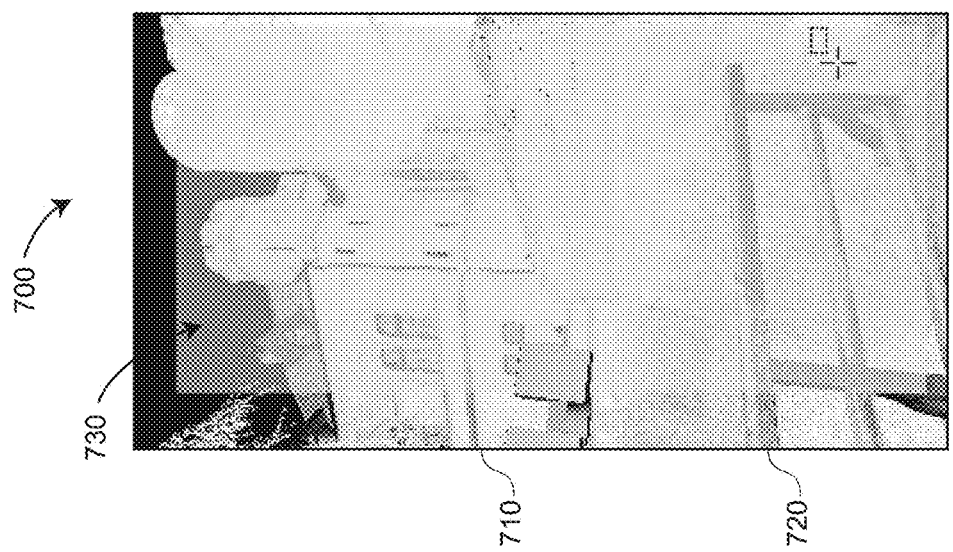
Figure 8:
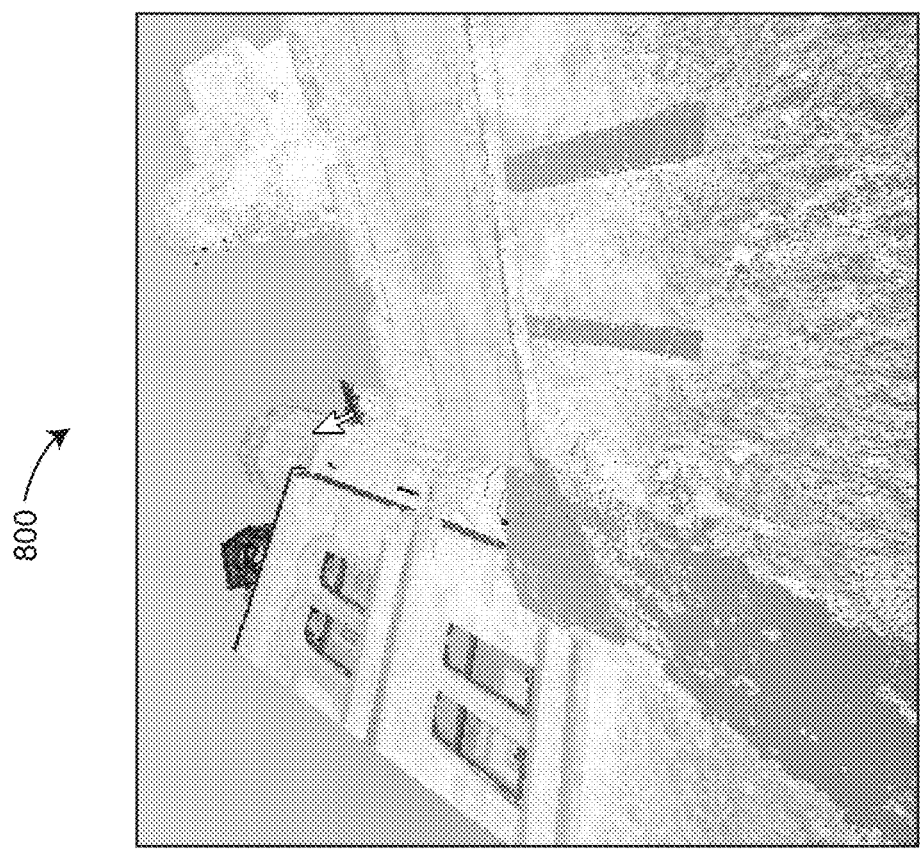
FIG. 8 depicts an embodiment of a 3D view made up of an image of the object of FIG. 7B but viewed from a different perspective and shown only partially.

FIGS. 7A, 7B, 7C depict an example of a 3D view of a 3D scanned image. In the 3D view a user can leave the origin of the scan and see the scan points from different viewpoints and angles. The 3D view is an example of a 3D processed scanned image. The 3D view may be in full resolution or reduced resolution depending on system characteristics. In addition, the 3D view allows multiple registered scans to be displayed in one view. FIG. 7A is a 3D view 710 over which a selection mask 730 has been placed by a user. FIG. 7B is a 3D view 740 in which only that part of the 3D view 710 covered by the selection mask 730 has been retained. FIG. 7C shows the same 3D measurement data as in FIG. 7B except as rotated to obtain a different view. FIG. 8 shows a different view of FIG. 7B, the view in this instance being obtained from a translation and rotation of the observer viewpoint, as well as a reduction in observed area.

Figure 9:
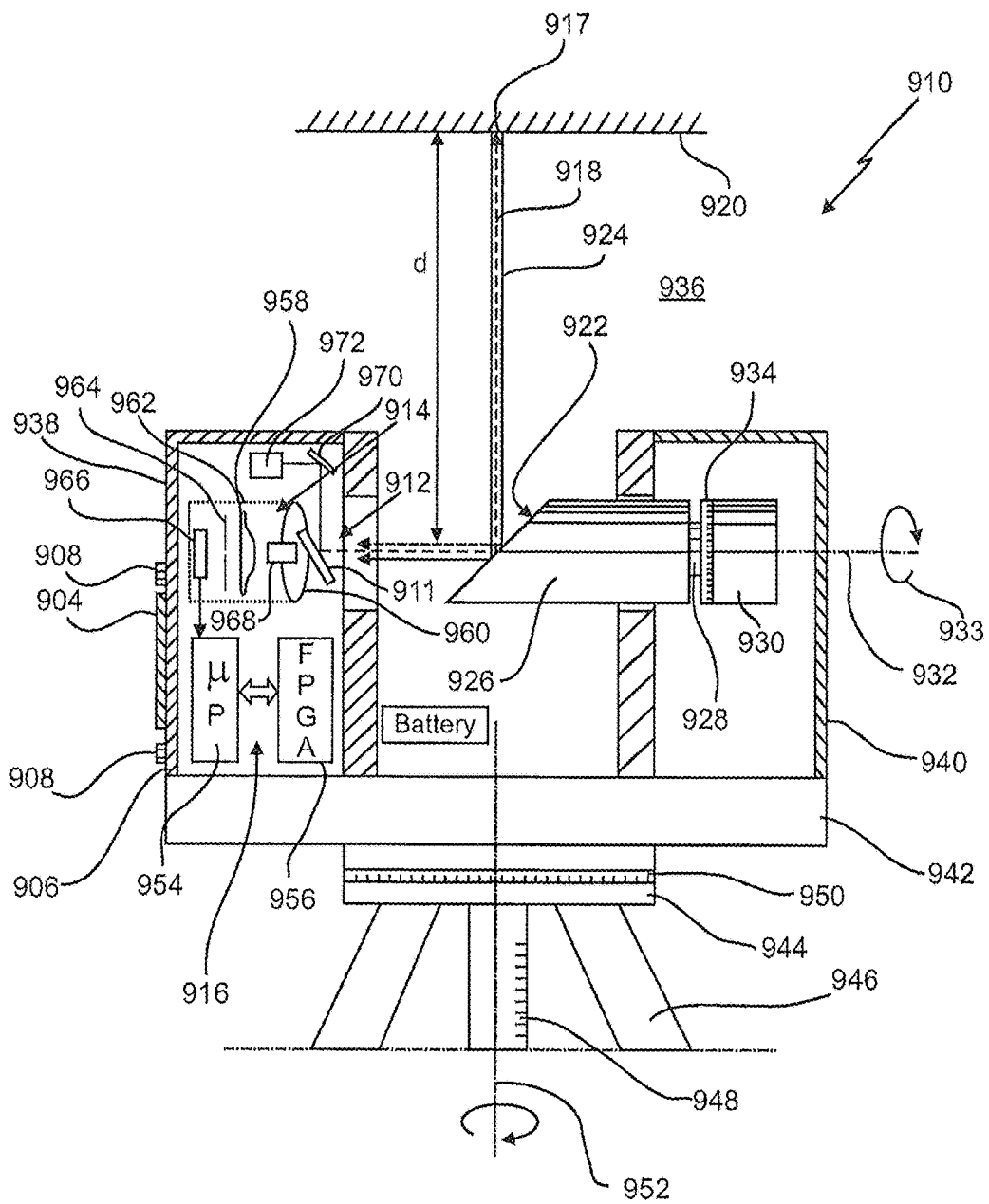
FIG. 9 depicts a laser scanner in accordance with an embodiment.

Referring to FIG. 9, the laser scanner 910 comprises a light emitter 912 and a light receiver 914, which are connected to an evaluation and control unit 916. In an embodiment, the light emitter 912 comprises a laser diode 972 that is designed to generate a laser beam 918 having a wavelength of approximately 905 nm as an emission light beam. The emission light beam 918 is emitted in order to illuminate a measuring point 917 on the surface of an object 920. In an embodiment, the emission light beam 918 is amplitude-modulated with a rectangular-waveform modulation signal in order to determine the distance d from the illuminated object point by evaluating phase information. Any suitable modulation signal may be utilized, for example, the emission light beam 918 can be modulated with a sinusoidal modulation signal and/or the emission light beam 918 can be emitted in pulsed fashion in order to determine the distance d on the basis of a pulse propagation time method.

The emission light beam 918 is deflected by a mirror 922 to the object 920. The reference number 924 designates a reception light beam that is reflected from the object 920 and is deflected via the mirror 922 to the receiver 914. The mirror 922 is arranged here at the angled front end face of a cylinder 926 connected to a rotary drive 930 via a shaft 928. With the aid of the rotary drive 930, the mirror 922 can be rotated about an axis 932 of rotation. The rotation direction is indicated here by reference numeral 933. The respective rotary position of the mirror 922 can be determined with aid of an angular encoder 934. The output signals of the encoder 934 are likewise fed to the evaluation and control unit 916 through wires not illustrated here for reasons of clarity.

In an embodiment, the axis 932 of rotation is arranged horizontally and the mirror 922 is inclined at an angle of approximately 45° relative to the axis 932 of rotation. A rotation of the mirror 922 about the horizontal axis 932 therefore has the consequence that the emission light beam 918 is deflected along a vertical plane (that is to say in elevation). The emission light beam 918 forms, when the mirror 922 is rotating, a fan with which the spatial region 936 is scanned in the vertical plane.

The laser scanner 910 here has a housing structure essentially having two housing parts 938, 940. The housing parts 938, 940 are arranged on a common baseplate 942. The emitter 912, the receiver 914 and the evaluation and control unit 916 are accommodated in the housing part 938 illustrated on the left in FIG. 9. The housing part illustrated on the right in FIG. 9 accommodates the rotary drive with the encoder 934 and the cylinder 926, wherein the cylinder 926 with the minor 922 projects from the housing part 940, such that the minor 922 is arranged approximately centrally between the two housing parts 938, 940.

The baseplate 942 is arranged on a rotary drive 944 seated on a stand 946. The stand 946 is height-adjustable and has a scaling 948 in order to be able to perform a reproducible height setting. The reference numeral 950 designates a further encoder, with the aid of which the rotational position of the rotary drive 944 can be determined. The output signals of the encoder 950 are likewise fed to the evaluation and control unit 916.

The rotary drive 944 enables the laser scanner 910 to be rotated about a vertical axis 952 which together with the axis 932 of rotation defines an axial intersection point. The axial intersection point here lies approximately centrally on the mirror 922 and, in exemplary embodiments, defines the origin of the system of coordinates to which all the distance measuring values d are referred. With the aid of the rotary drive 944, the vertical "scanning fan" can be rotated by 360° in azimuth. The emission light beam 918 can thus illuminate practically any object point in the vicinity of the scanner 910. Shading of the emitted laser beam takes place only toward the bottom by the baseplate 942, such that the viewing angle of the laser scanner 910 is limited somewhat toward the bottom.

The evaluation and control unit 916 here comprises a microprocessor 954 and an FPGA (field programmable gate array) 956. The FPGA 956 here generates the binary rectangular-waveform modulation signal with which the laser diode of the light emitter 912 is driven. The microprocessor 954 reads in digitized reception data from the light receiver 914 and determines the distance d between the laser scanner 910 and the object 920 on the basis of these data. The microprocessor 954 and the FPGA 956 communicate with one another, wherein the microprocessor 954 receives, inter alia, the phase information of the emission light beam for determining the propagation time.

The reception optical unit 958 of the light receiver 914 comprises at least one first lens element 960 (there can also be a plurality of first lens elements which together fulfill the function of the first lens element described below), a second lens element 962 and a pinhole diaphragm 964. The light detector 966 is arranged behind the pinhole diaphragm 964 and detects the reception light beam 924. As can readily be understood, the light emitter 912 shades the reception light beam 924 in a central region of the reception optical unit since the light emitter 912 here is arranged coaxially in front of the light receiver 914. In order to illustrate this shading pictorially, the reception light beam 924 is illustrated "doubly" and with an exaggerated width in comparison with the emission light beam 918. The reception light beam 924 actually reaches the light detector 966 here in the form of a light ring whose inner center is shaded by the light emitter 912.

As shown in FIG. 9, a laser collimator 972 is beside the receiving optics. Via mirror 970 and mirror 911, laser light is transmitted to the large rotating mirror 922. A color camera 968 is located behind mirror 912 in a hole of lens 960. Mirror 912 is transparent for visible light and acts as a mirror for the 905 nm wavelength of the laser. Thus, the color camera 968 can take images of the environment of the scanner through mirror 912 and mirror 922. An advantage of this setup is the colinearity of the camera with the laser and therefore with the scan. This way the parallax is reduced to a minimum.

As shown in FIG. 9, laser scanner 910 has a graphics display 904, which here is arranged on an outer housing wall 906 of the housing part 938. The graphics display 904 is driven by the microprocessor 954, and it serves as a user interface. In one exemplary embodiment, the graphics display 904 is a touch-sensitive screen (touch screen). In addition or as an alternative thereto, operating keys 908, embodied here as so-called soft keys, are arranged on the housing wall 906 in the region of the graphics display 904. In the case of these soft keys, the function of the operating keys 908 changes depending on what is respectively displayed on the graphics display 904. In an exemplary embodiment, the graphics display 904 furthermore serves to display a distance image and/or an optical image that was recorded with the aid of the first light detector 966 and/or the camera 968, respectively. The distance image shows the recorded spatial region 936 in the form of a black and white image or in the form of a false color representation, wherein each represented pixel represents a 3D coordinate value that can be displayed when a cursor moves to the corresponding pixel. In an embodiment, the optical image is a color image which was recorded with the aid of the camera 960 and which shows the spatial region 936.

Figure 10:
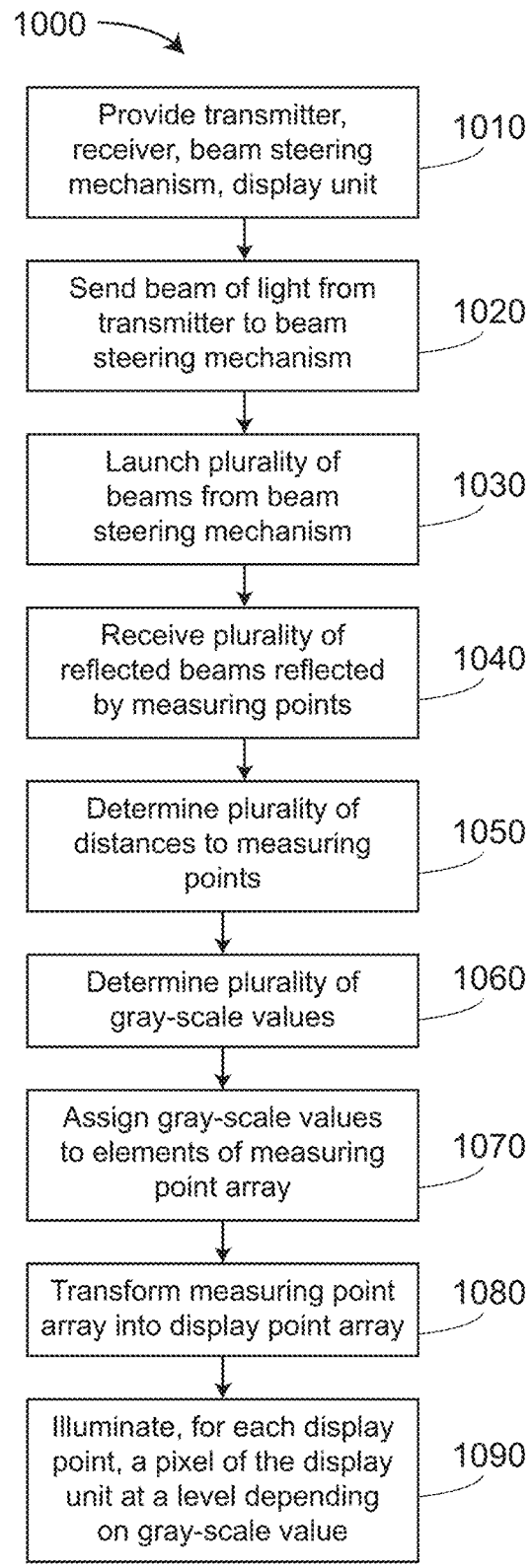
FIG. 10 is a flow chart showing a process for measuring a volume of space with a laser scanner according to an embodiment.

A process 1000 for displaying gray-scale images on an integral display of a laser scanner is illustrated in FIG. 10. Block 1010 provides a transmitter, a receiver, a beam steering mechanism, and a display unit. The display unit is built into the laser scanner. An example of such an integral display unit is element 904 of FIG. 9.

At block 1020, a beam of light is sent from the transmitter to the beam steering mechanism.

At block 1030, a plurality of measuring beams are launched from the beam steering mechanism to a plurality of measuring points in the volume of space, the measuring beams launched sequentially. An example of such a beam steering mechanism is the mirror 922 together with the rotary drive 944.

At block 1040, a plurality of reflected beams that are a portion of the measuring beams reflected by measuring points are received. An example is shown in FIG. 9, wherein the measuring points 917 reflect a portion of the measuring beams to light receiver 914.

A plurality of distances to the measuring points based at least in part on propagation times of the measuring beams and the reflected beams are determined at block 1050. In the example of laser scanner 910, the distance is determined by measuring the change in phase of modulated light with optical detector 966, microprocessor 954, and field-programmable gate array (FPGA) 956.

At block 1060, a plurality of gray-scale values representative of the measuring points are determined, the gray-scale values based at least in part on optical powers of the reflected beams. Gray scale values indicate the relative amount of light reflected by objects and represents to some extent how objects are perceived by a human eye (a black-and-white or gray version of human vision). In general, gray-scale values are based on the optical powers in reflected light received by an optical detector (e.g., the optical detector 966). In the embodiments considered herein, any quantity related to the returned optical power is a valid measure of gray-scale value. In the discussion that follows, some specific examples of how gray-scale values may be found are given. Because the light scattered by the measuring points (e.g., points like 917) and received by the optical detector 966 generally falls off quickly with distance, gray-scale values calculated entirely on returned optical power may be too dim to be easily seen by the eye. There are many ways to represent gray-scale values to get around this problem. One method is to display optical power in a logarithmic scale. In this way, light reflected by relatively closely spaced objects will be judged in contrast to nearby neighbors as relatively bright or dim according to their relative reflectance values. On the other hand, objects far away will still be relatively highly visible because of the logarithmic scaling. Another method of obtaining grey level is to divide the returned optical power by a factor depending on the distance to the object under observation. In this way, optical powers reflected by objects at different distances can be normalized.

At block 1070 gray-scale values are assigned to elements of a measuring point array, a first index of the measuring point array associated with an order of measurement of the measuring points. This block simply provides a method of collecting scanner data related to the objects being measured while at the same time retaining information about the collection geometry based on the order of data collection.

The measuring point array is transformed into a display point array according to a first mathematical rule at block 1080, where the display point array corresponds to a first number of display points and the measuring point array corresponds to a second number of measuring points, the first number being equal to or less than the second number, the transforming including a block of assigning display gray-scale values to elements of the display point array. In general, the number of points measured over a volume of space may not be equal to the number of pixels on the display unit. In most cases, the number of measurement points exceeds the number of pixels on the display unit, which is to say that the number of measuring points exceeds the number of display points. A simple transformation is to take every $n^{th}$ data point so as to provide a sampling of the measured volume of space on the user display. The selected data points are arranged in a rectangular array to fit the dimensions of the user interface. Gray-scale values are assigned to each of the elements of the display point array in accordance with the gray-scale value of the measuring point or measuring points corresponding to the position in the display point array.

Block 1090 is to illuminate, for each display point, a pixel of the display unit, a level of illumination depending on the display gray-scale value. This block in effect translates a two-dimensional display point array, which is an array of numerical gray-scale values, into an illuminated array of pixels in the display unit.

Figure 11:
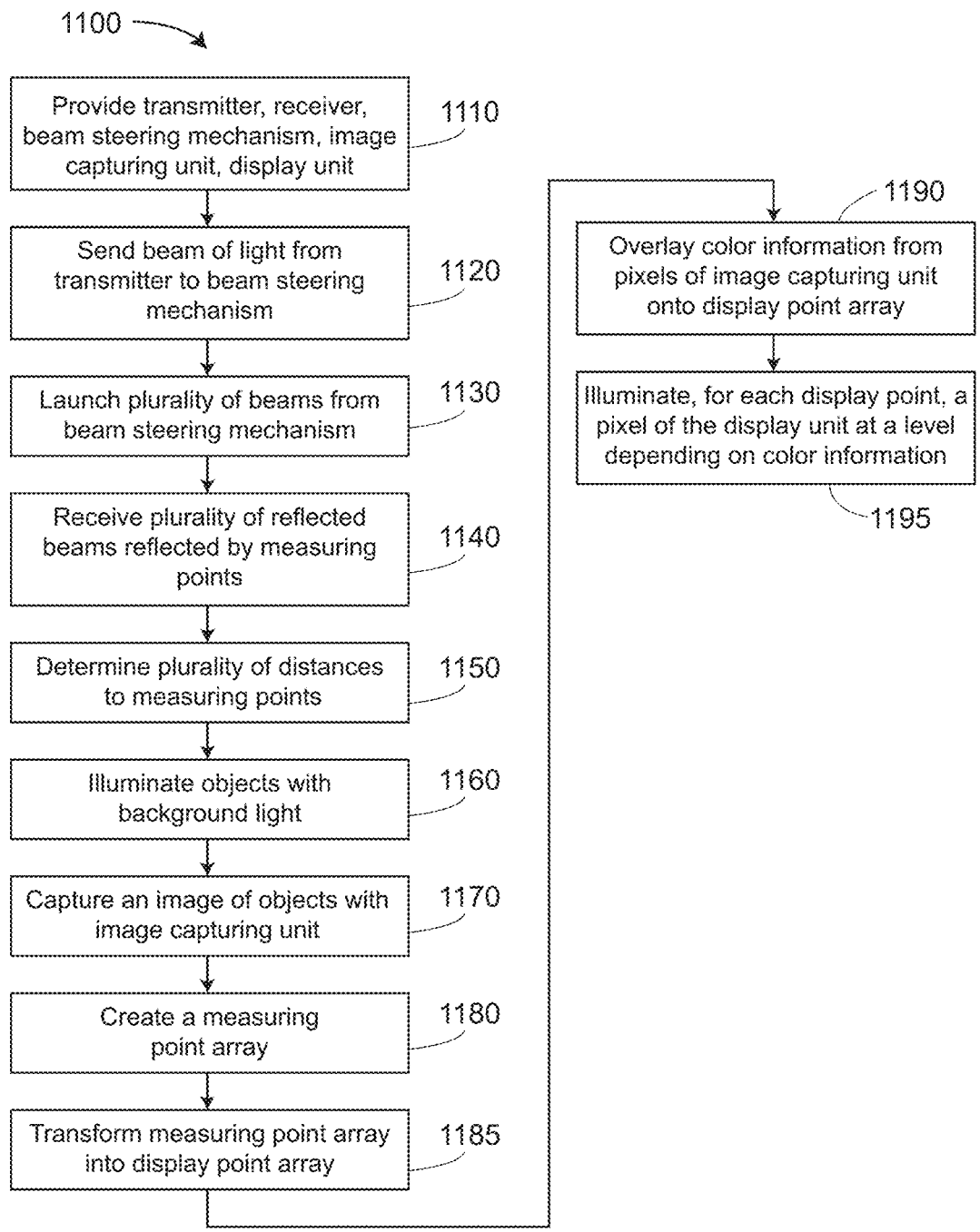
FIG. 11 is a flow chart showing a process for measuring a volume of space with a laser scanner according to an embodiment.

A process 1100 for displaying color images on an integral display of a laser scanner is illustrated in FIG. 11. At block 1110, a laser scanner is provided that includes a transmitter, a receiver, a beam steering mechanism, an image capturing unit, and a display unit, the display unit integral to the laser scanner.

At block 1120, a beam of light is sent from the transmitter to the beam steering mechanism.

At block 1130, a plurality of measuring beams are launched from the beam steering mechanism to a plurality of measuring points in the volume of space, the measuring beams launched sequentially. An example of such a beam steering mechanism is the mirror 922 together with the rotary drive 944.

At block 1140, a plurality of reflected beams that are a portion of the measuring beams reflected by the measuring points are received. An example is shown in FIG. 9, wherein the measuring points 917 reflect a portion of the measuring beams to light receiver 914.

At block 1150, a plurality of distances to the measuring points are determined based at least in part on propagation times of the measuring beams and the reflected beams. In the example of laser scanner 910, the distance is determined by measuring the change in phase of modulated light with optical detector 966, microprocessor 954, and field-programmable gate array (FPGA) 956.

At block 1160, objects within the volume of space with background light are illuminated. In other words, objects in space are illuminated both by measuring beams emitted by the transmitter and by background light, which may be provided by the sun or by artificial light. The two types of light are provided for different purposes. The measuring beams of light provided by the transmitter are used by the distance meter within the laser scanner to measure distances to measuring points within the volume of space. The background light is used to illuminate objects for viewing by the image capturing unit, which may be a color camera, for example. Unlike the measuring beams of light provided by the transmitter, which usually contain only one or two wavelengths of light, a color camera is usually sensitive to three colors of light such as red, blue, and green. Background light usually provides a multiplicity of colors so that the color camera can capture the colors of the objects being scanned to relatively good accuracy.

At block 1170, an image of the objects with the image capturing unit are captured, the image capturing unit including pixels, each pixel providing color information. An example of an image capturing unit is the camera 968 shown in FIG. 9.

At block 1180, a measuring point array is created, where a first index of the measuring point array associated with an order of measurement of the measuring points. The measuring point array contains the geometry of the measured points. In an embodiment, a scanner moves over a specified pattern so that points collected sequentially in time correspond to particular angles for the measuring beams. For example, the angles may correspond to particular azimuth and zenith angles. In many cases, the measuring point array will contain measured values such as measured distances, measured gray-scale values, and measured angles. However, whether the measuring point array contains such measured values or not, the array itself, which is tied to the order of measurement of the measuring points, intrinsically contains information about the geometry of the measurement. As another example, the laser scanner may be of the type in which the measuring beams are not emitted in a specified geometrical pattern but rather may be directed in any desired pattern. In this instance, the geometrical meaning of the measuring point array depends on the particular angles of the measuring beam during the course of the measurement. Such movements may be recorded as a part of the measuring point array or recorded separately.

At block 1185, the measuring point array is transformed into a display point array according to a first mathematical rule, where the display point array corresponds to a first number of display points and the measuring point array corresponds to a second number of measuring points, the first number being equal to or less than the second number. In general, the number of points measured over a volume of space may not be equal to the number of pixels on the display unit. In most cases, the number of measurement points exceeds the number of pixels on the display unit, which is to say that the number of measuring points exceeds the number of display points. A simple transformation is to take every $n^{th}$ data point so as to provide a sampling of the measured volume of space on the user display. The selected data points are arranged in a rectangular array to fit the dimensions of the user interface. Color information is assigned to each of the elements of the display point array in accordance with the color information of the measuring point or measuring points corresponding to the position in the display point array.

At block 1190, color information obtained from the pixels of the image capturing unit are overlaid onto the display point array, the color information overlaid on each display point representing substantially the same region of space as the region of space represented by the display point. This block will in general require a mapping, which is a type of mathematical transformation, of the color information onto the elements of the display point array. The angular extent covered by each pixel of the image capturing unit will in general be different than the angular extent of each point in the display point array.

At block 195, for each display point, a pixel of the display unit is illuminated, the illumination color and brightness depending on the color information overlaid onto the display point. The color information, for example, may include a brightness value for each of three colors red, green, and blue.

Technical effects and benefits include the ability to verify that scan data has been captured correctly and that a scan by a laser scanner is complete. This can lead to more complete scans being performed by an operator in one scanning session and thus, may lead to a reduction in the number of times that an operator has to return to a scanned location to redo the scanning or to obtain supplemental scan data. In addition, it can lead to reduced measurement time and simplified setup.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A laser scanner configured to measure three-dimensional (3D) coordinates of an object, comprising:
    a mirror configured to rotate about a first axis, the mirror having a flat reflective surface;
    a first portion including the mirror, the first portion configured to rotate about a second axis perpendicular to the first axis, the first portion further including a light emitter, and a light receiver, the light emitter is configured to send emitted light to the mirror for reflection onto the object, the light receiver is configured to receive from the mirror a reflected light, the reflected light being a part of the emitted light reflected by the object;

one or more processors that are operably coupled to a tangible non-transitory storage medium, the light emitter and the light receiver;

a display unit operably coupled to the processor, the display unit further being coupled to the laser scanner;

the one or more processors being responsive to executable instructions which when executed by the processor is operable to:

cause the scanner to collect gray-scale values and associated 3D coordinates in a spherical coordinate system based at least in part on the light received by the light receiver;

display on the display unit reformatted gray-scale values, the reformatted gray-scale values being gray-scale values reformatted from the spherical coordinate system into a rectangular region as a planar view;

the reformatted gray-scale values when reformatted from the spherical coordinate system into the rectangular region in the planar view have at least one straight line of the object scanned appearing as a curved line on the display;

enable selection of a first angular range of measurement about the second axis, the first angular range of measurement being between 0 and 360 degrees;

cause the laser scanner to measure first gray-scale values and associated 3D coordinates in the spherical coordinate system over the first angular range of measurement;

display on the display unit the first reformatted gray-scale values, the first reformatted gray-scale values being the first gray-scale values reformatted from the spherical coordinate system into a first region, the first region being rectangular in shape, the rectangular shape of the first region extending and covering the first angular range; and save the first reformatted gray-scale values and first associated 3D coordinates on the storage medium, the first associated 3D coordinates being 3D coordinates associated with the first gray-scale values.

2. The laser scanner of claim 1, wherein the executable instructions when executed by the one or more processors is further operable to enable selection of a first reformatted gray-scale point on the display unit and in response determine a first 3D coordinate, the first 3D coordinate being an associated 3D coordinate of the first reformatted gray-scale point.

3. The laser scanner of claim 2, wherein the executable instructions when executed by the one or more processors is further operable to enable selection of a second reformatted gray-scale point on the display unit and in response determine a second 3D coordinate, the second 3D coordinate being an associated 3D coordinate of the second reformatted gray-scale point.

4. The laser scanner of claim 3, wherein the executable instructions when executed by the one or more processors is further operable to determine a first 3D distance between the first 3D coordinate and the second 3D coordinate.

5. The laser scanner of claim 4, wherein the executable instructions when executed by the one or more processors is further operable to:

enable selection of a second angular range of measurement about the second axis, the second angular range of measurement being an angular subset of the first angular range of measurement;

extract from the storage medium the second reformatted gray-scale values corresponding to the second angular range of measurement; and display on the integrated display the second reformatted gray-scale values.

6. The laser scanner of claim 5, wherein the executable instructions when executed by the one or more processors is further operable to:

enable selection of a panoramic display mode;

perform a mathematical transformation to convert reformatted gray-scale values into a panoramic representation of gray-scale values that removes distortions present in display of the planar view; and display on the integrated display unit the panoramic representation.

* * * * *